(12) United States Patent
Chen et al.

(10) Patent No.: US 12,512,510 B2
(45) Date of Patent: Dec. 30, 2025

(54) GEL COMPOSITE ELECTROLYTE MEMBRANE FOR LITHIUM METAL BATTERIES

(71) Applicant: UT-Battelle, LLC, Oak Ridge, TN (US)

(72) Inventors: Xi Chen, Oak Ridge, TN (US); Yiman Zhang, Oak Ridge, TN (US); Tomonori Saito, Oak Ridge, TN (US); Nancy J. Dudney, Oak Ridge, TN (US); Michelle Lehmann, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 917 days.

(21) Appl. No.: 17/675,070

(22) Filed: Feb. 18, 2022

(65) Prior Publication Data

US 2022/0263130 A1 Aug. 18, 2022

Related U.S. Application Data

(60) Provisional application No. 63/150,685, filed on Feb. 18, 2021.

(51) Int. Cl.
*H01M 10/0565* (2010.01)
*H01M 10/0525* (2010.01)

(52) U.S. Cl.
CPC ... *H01M 10/0565* (2013.01); *H01M 10/0525* (2013.01); *H01M 2300/0082* (2013.01); *H01M 2300/0085* (2013.01)

(58) Field of Classification Search
None
See application file for complete search history.

(56) References Cited

U.S. PATENT DOCUMENTS

| | | | | |
|---|---|---|---|---|
| 6,878,491 | B1* | 4/2005 | Miura | H01M 10/052 429/312 |
| 2016/0149261 | A1* | 5/2016 | Zaghib | H01M 4/58 156/60 |
| 2019/0198923 | A1* | 6/2019 | Yoo | H01M 10/056 |
| 2020/0266478 | A1* | 8/2020 | Castro | H01M 10/0565 |
| 2021/0288350 | A1* | 9/2021 | Bouchet | H01M 10/0565 |
| 2022/0102756 | A1* | 3/2022 | Frieberg | H01M 10/0569 |

* cited by examiner

*Primary Examiner* — Nathanael T Zemui
(74) *Attorney, Agent, or Firm* — WARNER NORCROSS + JUDD LLP

(57) ABSTRACT

An improved gel composite electrolyte membrane and a method of its manufacture are provided. The method includes mixing polymer precursors, a lithium salt, and a ceramic filler in a vessel to form a mixture. The mixture is cast on a preheated substrate and cured to form a crosslinked composite electrolyte membrane. The composite electrolyte membrane is plasticized by immersing the composite electrolyte in a plasticizer to obtain a gel composite electrolyte membrane. The addition of a plasticizer and a ceramic filler synergistically and simultaneously act to improve the Li+ transference number and Li+ conductivity of the resulting composite electrolyte, exhibiting high ionic conductivity and mechanical stability as well improved cycling performance. The gel composite electrolyte membrane is particularly suitable for, but not limited to, lithium metal batteries.

15 Claims, 1 Drawing Sheet

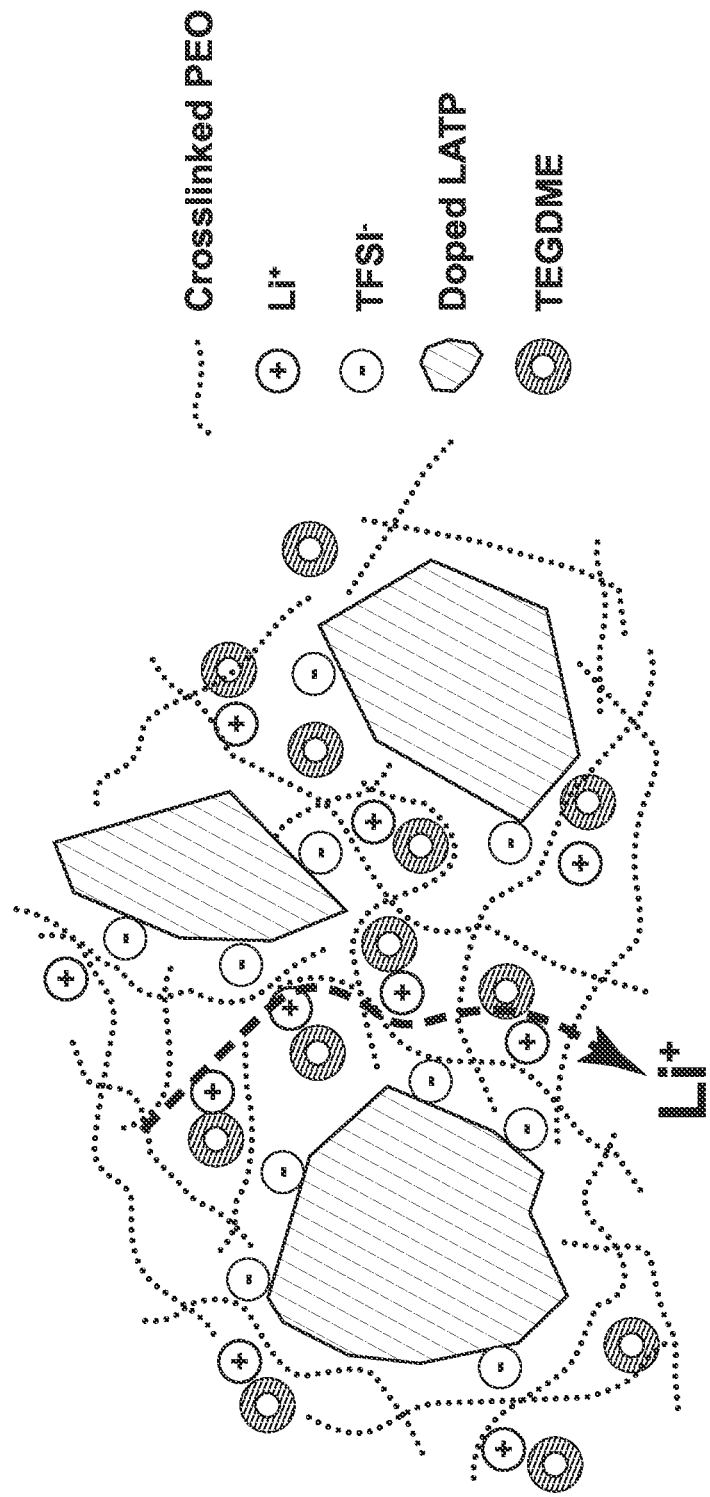

GEL COMPOSITE ELECTROLYTE MEMBRANE FOR LITHIUM METAL BATTERIES

CROSS-REFERENCE TO RELATED APPLICATIONS

This application claims the benefit of U.S. Provisional Application 63/150,685, filed Feb. 18, 2021, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to a gel composite electrolyte membrane and a method of manufacturing the gel composite electrolyte membrane for lithium metal batteries and other applications.

BACKGROUND OF THE INVENTION

Poly(ethylene oxide) (PEO) based polymer electrolytes are the most widely used polymer electrolyte material in lithium batteries. However, PEO based electrolytes suffer from low room-temperature ionic conductivity and low $Li^+$ transference number. A polymer-ceramic composite in which highly conductive ceramic fillers are incorporated into a polymer electrolyte matrix has been considered as a solution to increase ionic conductivity. However, the large interfacial resistance between the polymer and ceramic electrolytes prevent effective ion transport through the ceramic phase when the ceramic particles are homogeneously dispersed in the polymer matrix. Previous work has shown that making the ceramic phase continuous and interconnected allows the conducting ceramic fillers to actively participate in ion conduction. Despite this success, the high temperature sintering required to make a connected ceramic structure adds to the manufacturing cost of the electrolyte material. Another solution to polymer electrolytes' low room temperature ionic conductivity is to infuse a liquid plasticizer into the polymer electrolyte to form a gel polymer electrolyte. However, this method doesn't solve the low $Li^+$ transference number problem associated with PEO based electrolytes.

SUMMARY OF THE INVENTION

An improved composite electrolyte membrane and method of manufacturing the membrane are provided. The disclosed membrane consists of crosslinked PEO as the polymer matrix, with a Li salt, a liquid plasticizer and ceramic fillers dispersed within. The crosslinked PEO network serves as a host for the plasticizer, thereby avoiding leakage and reducing the flammability of the organic plasticizers. The addition of a plasticizer and a ceramic filler act synergistically and simultaneously to improve the $Li^+$ transference number and $Li^+$ conductivity of the resulting composite electrolyte. The improved $Li^+$ transference number and $Li^+$ conductivity leads to improved cycling characteristics, including lower interfacial impedance with Li, lower overpotential, and higher rate capability. Additionally, the gel composite electrolyte exhibits improved processability and handleability, and can be made much thinner than previous polymer electrolytes.

In particular embodiments, the gel composite electrolyte includes a polymer matrix membrane having a crosslinked network of poly(ethylene oxide). A ceramic filler, a lithium salt, and a plasticizer are dispersed in the polymer matrix.

In certain embodiments, the polymer matrix may include a poly(ethylene glycol) diglycidyl ether (PEGDGE) unit and a O,O'-Bis(2-aminopropyl)polypropylene glycol-block-polyethylene glycol-block-polypropylene glycol unit. The polymer matrix alternatively may include a poly(ethylene glycol) dimethacrylate or a poly(ethylene glycol) diacrylate. The ceramic filler may be a lithium-ion conducting ceramic powder. The lithium-ion conducting ceramic powder may be a doped lithium aluminum titanium phosphate (LATP) ceramic having the general composition $Li_2O$—$Al_2O_3$—$SiO_2$—$P_2O_5$—$TiO_2$—$GeO_2$. The lithium-ion conducting ceramic powder may be lithium lanthanum titanate (LLTO) having the composition $Li_{0.35}La_{0.55}TiO_3$. The lithium salt may be lithium bis-trifluoromethanesulfonimide (LiTFSI). The plasticizer may be tetraethylene glycol dimethyl ether (TEGDME) or dimethyl carbonate (DMC). The ceramic filler may be loaded in the polymer matrix membrane at a weight % of between 20 and 90, preferably between 30 and 70. The polymer matrix membrane may have a thickness of between 60 and 100 μm. The volume % of the plasticizer in the gel composite electrolyte may be between 40 and 70, preferably between 50 and 60.

In particular embodiments, the method of manufacturing the gel composite electrolyte includes mixing polymer precursors, a lithium salt, and a ceramic filler in a vessel to form a mixture. The method also includes casting the mixture on a preheated substrate and curing to form a crosslinked composite electrolyte membrane. The method also includes plasticizing the composite electrolyte membrane by immersing the composite electrolyte in a plasticizer to obtain a gel composite membrane.

In certain embodiments, the method may include adding ethanol to the mixture to aid in the dispersion of the ceramic particles. The method may also include ball milling the mixture prior to the step of casting. The substrate used for casting may have a Teflon surface. The method may also include the step of drying the composite electrolyte membrane prior to the step of plasticizing. The step of drying may include transferring the composite electrolyte membrane into an argon filled box and disposing the container in a vacuum furnace. The step of plasticizing may be performed in a sealed container inside an argon filled box.

These and other features of the invention will be more fully understood and appreciated by reference to the description of the embodiments and the drawings.

BRIEF DESCRIPTION OF THE DRAWING

FIG. 1 is a schematic view of a gel (plasticized) composite electrolyte membrane including a crosslinked network of PEO with salt, plasticizer and ceramic particles dispersed in it.

DETAILED DESCRIPTION OF THE CURRENT EMBODIMENTS

As discussed herein, the current embodiments relate to a gel composite electrolyte membrane and a method of its manufacture. The method includes a one-pot procedure in which the composite membrane components (polymers, lithium salt, and ceramic particles) are mixed in a single vessel or similar container, cast on a preheated substrate using a doctor blade, and cured to form a composite membrane. Subsequently, the composite membrane is combined with a plasticizer to obtain a gel composite membrane. Each step is separately discussed below. The obtained gel composite membrane exhibits improved ionic conductivity, mechanical stability, and cycling performance.

The method first includes mixing polymer precursors, a lithium salt, and a ceramic filler in a vessel to form a mixture. The polymer precursors typically include an amine-functional compound such as an amine-functional poly(ethylene oxide) or poly(propylene oxide) and an epoxy-functional compound, which when combined form a crosslinked polymer membrane. The amine-functional compound and the epoxy-functional compound may be present in the mixture in a volume ratio of 1:10 to 10:1, alternatively 5:10 to 10:5, alternatively 7:10 to 10:7, alternatively 9:10 to 10:9, and preferably 9:10. The polymer precursors may be mixed together at room temperature for a time period of between 1 and 4 hours, alternatively between 1 and 3 hours, alternatively between 1.5 and 2.5 hours. The lithium salt may then be added to the polymer precursors and mixed for an additional time period of between 1 and 4 hours, alternatively between 1 and 3 hours, alternatively between 1.5 and 2.5 hours. The weight ratio of lithium salt to polymer precursors may be from 7:1 to 1:7, alternatively 5:1 to 1:5, alternatively 4:1 to 1:4, and preferably 1:4. The polymer precursors can also include a divinyl compound such as diacrylate or dimethacrylate terminated poly(ethylene oxide) and an initiator, which when combined form a crosslinked polymer membrane. The ceramic filler is typically constituted by ion-conducting ceramic particles having a high room temperature ionic conductivity of around $1 \times 10^{-4}$ S cm$^{-1}$ and a mean particle diameter of from 0.1 to 10 μm, preferably 1 μm. The content of ceramic filler may be in a range of between 0 and 70% by weight, alternatively between 30 and 70% by weight, alternatively between 30 and 50% by weight. The mixture may be ball milled subsequent to the addition of the ceramic filler, for a time period of 1 to 30 minutes, alternatively 5 to 20 minutes, alternatively 8 to 15 minutes. In exemplary embodiments, the amine-functional compound is O,O'-Bis(2-aminopropyl) polypropylene glycol-block-polyethylene glycol-block-polypropylene glycol, the epoxy-functional compound is poly(ethylene glycol) diglycidyl ether, the lithium salt is lithium bis-trifluoromethanesulfonimide, and the ceramic particles are a doped lithium aluminum titanium phosphate (LATP) ceramic powder.

The method then includes casting the liquid mixture on a preheated substrate and curing to form a crosslinked composite electrolyte membrane. The substrate may be heated to a temperature in the range of 40 to 80° C., alternatively 50 to 70° C. Curing the electrolyte polymer mixture may be performed in a vacuum furnace at an elevated temperature for a predetermined time period. Curing the electrolyte polymer can be performed at 70° C. to 130° C., 80° C. to 120° C., or 90° C. to 110° C., optionally for 2 to 48 hours, for 8 to 24 hours, 12 to 20 hours, or 14 to 18 hours. After curing, the composite electrolyte membrane is dried.

The method then includes plasticizing the composite electrolyte membrane by immersing the composite electrolyte in a plasticizer to obtain a gel composite membrane as shown schematically by example in FIG. 1. The composite electrolyte membrane may be immersed in the plasticizer for a time period of 10 minutes to 4 hours, alternatively 30 minutes to 2 hours, alternatively 45 minutes to 1.25 hours. The plasticizing step may be performed in an argon filled glovebox. The present method utilizes crosslinked PEO and the plasticizer is added after formation of the crosslinked membrane. In exemplary embodiments, the plasticizer is tetraethylene glycol dimethyl ether (TEGDME). The gel composite electrolyte membrane may have a thickness of less than 100 μm, alternatively less than 80 μm, alternatively less than 70 μm, alternatively between 20 and 70 μm, alternatively between 50 and 70 μm, and may have a ceramic volume fraction in the range of 35 and 70 vol. %, alternatively between 40 to 60 vol. %, alternatively between 45 and 55 vol. %.

EXAMPLES

The present gel composite electrolyte membrane and method of its manufacture is further described in connection with the following laboratory examples, which are intended to be non-limiting.

O,O'-Bis(2-aminopropyl) polypropylene glycol-block-polyethylene glycol-block-polypropylene glycol (Jeffamine ED-900, Sigma-Aldrich) and poly(ethylene glycol) diglycidyl ether (PEGDGE, average $M_n$ 500, Sigma-Aldrich) were mixed in a weight ratio of 9:10 at room temperature under constant stirring for 2 hours. Lithium bis-trifluoromethanesulfonimide (LiTFSI, 3M), which was dried in a vacuum furnace inside an argon (Ar) filled glovebox at 150° C. for 24 hours prior to use, was then added to the polymer electrolyte and stirred for another 2 hours, until it was fully dissolved. The weight ratio of LiTFSI to Jeffamine+PEGDGE was 1:4 in a dry membrane. Calculated weights of a lithium-ion conducting glass ceramic powder, which is a doped lithium aluminum titanium phosphate (LATP) ceramic having the general composition $Li_2O$—$Al_2O_3$—$SiO_2$—$P_2O_5$—$TiO_2$—$GeO_2$ having an average particle size of 1 μm, were added into the Jeffamine/PEGDGE/LiTFSI mixture to prepare ceramic-containing composite electrolyte membranes. A small amount of ethanol was added into the mixtures to aid in the dispersion of the ceramic particles. The mixtures were then ball milled for 10 minutes and cast on a Teflon substrate with a doctor blade. The Teflon substrate was preheated to 60° C. to allow for the rapid evaporation of ethanol. The mixtures were then cured at 100° C. under vacuum for 16 hours, and the obtained composite electrolyte membranes were dried inside an argon glovebox in a vacuum furnace at 80° C. for 16 hours. To prepare the gel composite membranes, pieces of dry membrane were soaked in tetraethylene glycol dimethyl ether (TEGDME, Sigma-Aldrich) for 1 hour in an argon glovebox. The TEGDME was dried on molecular sieves prior to use. Salt was not observed leaching out of the membranes within the soaking time.

To perform Li symmetrical cell measurements, gel polymer and composite electrolyte membranes (for comparison) were sandwiched between two Li electrodes in CR2032 coin cells, which were assembled in an argon filled glovebox. The surfaces of the membranes were dabbed with Kimwipe to avoid flooding of TEGDME.

Full cells were assembled with a $LiNi_{0.6}Mn_{0.2}Co_{0.2}O_2$ (NMC622) cathode and gel composite electrolyte membrane, and cycled with Li metal as the counter electrode. The NMC622 cathode consisted of 90% by weight NMC622 (BASF), 5% by weight carbon black (Denka), and 5% by weight PFDF (Solvey), and was prepared by the slurry-casting-drying method. For full cell cycling, the NMC cathode was wet with 20 μL of LiPF$_6$ in EC/DMC as the catholyte. The cell components were assembled into a standard CR2032 coin cell. Cycling was performed at room temperature on a Maccor tester between 3.0 and 4.2 V versus Li$^+$/Li.

Fabricated composite membranes having 50 wt. % ceramic demonstrated significantly enhanced handleability and were easily made thinner than 100 μm, and generally had a thickness of about 60 μm.

The effect of ceramic particles on the TEGDME content of the films is shown in Table 1 below. TEGDME uptake first increased at 30 wt. % loading and then decreased above 50 wt. % loading. The dimensional swelling of the films (i.e., volume wet compared to volume dry) was calculated by measuring the dimensions of the films before and after TEGDME soaking. The film with 30 wt. % ceramic exhibited more swelling (72.0%) compared to the pristine polymer film (56.8%). The film with 50 wt. % ceramic exhibited significantly less swelling (30.1%) compared to the pristine polymer film. As ceramic loading increases, the TEGDME/polymer ratio increased. The TEGDME/Li$^+$ ratio also increased with increasing ceramic loading. At the same time, with increasing ceramic loading, the polymer's volume fraction decreased, so the volume fraction of TEGDME with respect to the total volume of the membrane stayed approximately the same at about 50 vol. %.

TABLE 1

TEGDME content of polymer and composite electrolyte membranes

| Ceramic loading (wt %) | TEGDME uptake (%) | TEGDME volume fraction (%) | Dimensional swelling (%) | TEGDME/ polymer (w/w) | TEGDME/ LiTFSI (w/w) |
|---|---|---|---|---|---|
| 0 | 72.5 | 50.1 | 56.8 | 0.91 | 3.6 |
| 30.0 | 78.6 | 56.6 | 72.0 | 1.32 | 5.6 |
| 50.0 | 52.7 | 50.0 | 30.1 | 1.40 | 5.3 |
| 70.0 | 46.2 | 50.8 | —[a] | 1.92 | 7.7 |

[a]Film was too fragile to measure.

The film with 50 wt. % ceramic exhibited improved resistance to dimensional swelling. This film also showed significantly improved handleability and processability, and could easily be made thinner than 100 μm.

The ionic conductivity, σ, of the composite electrolyte membranes in comparison to polymer membrane electrolytes in both dry and plasticized states are shown in Table 2 below. Dry polymer electrolyte without ceramic particles has a σ of 8.2×10$^{-6}$ S/cm at 30° C., which is relatively low. The incorporation of ceramic particles into the dry membranes led to decreased ionic conductivity.

TABLE 2

Ionic conductivity, σ, at 30° C., activation energy E$_a$ and Li$^+$ conductivity of polymer and composite electrolyte membranes

| Ceramic loading (wt %) | σ (dry) at 30° C. (S cm$^{-1}$) | E$_a$ (dry) (eV) | σ (TEGDME) at 30° C. (S cm$^{-1}$) | E$_a$ (TEGDME) (eV) |
|---|---|---|---|---|
| 0 | 8.2 × 10$^{-6}$ | 0.55 | 1.3 × 10$^{-4}$ | 0.23 |
| 30 | 3.9 × 10$^{-6}$ | 0.51 | 1.5 × 10$^{-4}$ | 0.25 |
| 50 | 7.9 × 10$^{-6}$ | 0.45 | 1.2 × 10$^{-4}$ | 0.23 |
| 70 | 1.3 × 10$^{-6}$ | 0.55 | 2.2 × 10$^{-5}$ | 0.23 |

When plasticized with TEGDME, σ of both the polymer electrolyte and the composite electrolytes increased by 1 to 2 orders of magnitude, and the activation energy, E$_a$, decreased to approximately half (from approximately 0.5 eV down to approximately 0.23 eV). In contrast to the dry membranes, at 30 and 50 wt %, σ of the gel composite membrane is similar to that of the gel polymer membrane. The negative impacts of the ceramic filler on the ionic conductivity is eliminated by the presence of the plasticizer. At 70 wt. % ceramic loading, σ was low even with the presence of plasticizers.

Li symmetrical cell cycling was performed on the TEGDME plasticized gel polymer and gel composite electrolyte with 50 wt. % ceramic. For convenience of comparison, these two electrolytes are hereinafter referred to as GPE and GCE-50. The cells were cycled at 50 μA cm$^{-2}$ at room temperature. The cell containing GCE-50 showed much lower overpotential, 0.04 V, versus the cell containing GPE, 0.13 V.

The impedance of the Li symmetrical cell with GPE and GCE-50 was taken prior to and after 100 hours of cycling. GCE-50 had a much smaller initial interfacial impedance (360 Ωcm$^2$) with Li electrodes compared to the GPE (750 Ωcm$^2$). After 100 hours, the interfacial impedance increase was much smaller for GCE-50 (560 Ωcm$^2$), compared to the GPE (1500 Ωcm$^2$). The increase in the interfacial impedance is associated with the growth of the passive layer formed at the electrolyte-Li interface. This result suggests that the passive layer grows slower in GCE-50, indicating better stability with Li.

Further, GCE-50 exhibited higher rate capability. At the current density of 100 μA cm$^{-2}$, GPE showed an unstable cycling profile and died after 95 hours. GCE-50, on the other hand, exhibited stable cycling. Overall, these results show that the addition of ceramic particles to the gel polymer electrolytes led to lower interfacial impedance with Li metal, increased stability, lower overpotential, and higher rate capability.

The cycling performance GPE and GCE-50 in full batteries was also evaluated. The full cells were assembled using a NMC622 cathode, TEGDME plasticized membranes and a Li metal anode. The cells were cycled at current densities of 0.05, 0.1, 0.2, and 0.3 mA cm$^{-2}$ between 3.0 and 4.2 V, at room temperature. In order to cycle the cells, the NMC cathode was wet with 20 μL of LiPF$_6$ in EC/DMC as the catholyte. At the lowest current density tested, 0.05 mA cm$^{-2}$, both the GPE and GCE-50 cells cycled well. The initial discharge capacity was relatively low, probably because good wetting of the catholyte with the cathode particles was still forming. After the first cycle, stable discharge capacity and good coulombic efficiency (>99.5%) were achieved for both cells. At higher current densities (>0.1 mA cm$^{-2}$), the GPE cell could not cycle. In contrast, GCE-50 showed good cycling performance at 0.1 and 0.2 mA cm$^{-2}$.

The electrolytes' Li$^+$ transference number, $t_{Li}^+$, was measured using the Bruce-Vincent method. Compared to GPE, $t_{Li}^+$=0.20, $t_{Li}^+$ increased more than two times for GCE-50 with $t_{Li}^+$=0.44. This leads to a 2-fold increase in the Li$^+$ conductivity (σ(Li$^+$)), shown in Table 2.

TABLE 3

Li$^+$ transference numbers, $t_{Li+}$, of plasticized membranes.

| Ceramic loading (wt %) | $t_{Li+}$ | σ (Li$^+$) at 30° C. (S cm$^{-1}$) |
|---|---|---|
| 0 | 0.20 | 2.6 × 10$^{-5}$ |
| 50 | 0.44 | 5.3 × 10$^{-5}$ |

In sum, the disclosed gel composite electrolyte membrane is fabricated by incorporating a doped LATP-type ceramic into a crosslinked PEO-based gel electrolyte membrane that is plasticized with TEGDME. The gel composite electrolyte with 50 wt. % ceramic exhibited superior cycling performance against Li metal, showing lower interfacial impedance, lower overpotential, and higher rate capability. This is due to a 2-fold increase in the $Li^+$ transference number and a 2-fold increase in the $Li^+$ conductivity in the gel composite electrolyte. Additionally, the transport enhancement was achieved without sacrificing the mechanical properties of the membrane, as the volume fraction of TEGDME in the composite and polymer electrolytes was relatively constant. Rather, the composite electrolyte showed significantly improved handleability.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A gel composite electrolyte comprising:
   a polymer matrix membrane including a poly(ethylene glycol) diglycidyl ether (PEGDGE) unit and a O,O'-Bis(2-aminopropyl) polypropylene glycol-block-polyethylene glycol-block-polypropylene glycol unit; and
   a ceramic filler, a lithium salt, and a plasticizer dispersed in the polymer matrix;
   wherein the ceramic filler is a lithium-ion conducting glass ceramic powder selected from a group consisting of a doped lithium aluminum titanium phosphate (LATP) ceramic having the general composition $Li_2O$—$Al_2O_3$—$SiO_2$—$P_2O_5$—$TiO_2$—$GeO_2$ or lithium lanthanum titanate (LLTO) having the composition $Li_{0.35}La_{0.55}TiO_3$.

2. The gel composite electrolyte of claim 1, wherein the lithium salt is lithium bis-trifluoromethanesulfonimide (LiTFSI).

3. The gel composite electrolyte of claim 1, wherein the plasticizer is one selected from a group consisting of tetraethylene glycol dimethyl ether (TEGDME) and dimethyl carbonate (DMC).

4. The gel composite electrolyte of claim 1, wherein the ceramic filler is loaded in the polymer matrix membrane at a weight % of between 30 and 70.

5. The gel composite electrolyte of claim 1, wherein the polymer matrix membrane has a thickness of between 60 and 100 μm.

6. The gel composite electrolyte of claim 1, wherein the volume % of the plasticizer in the gel composite electrolyte is between 50 and 60.

7. A method of manufacturing a gel composite electrolyte, the method comprising:
   mixing polymer precursors, a lithium salt, and a ceramic filler in a vessel to form a mixture, wherein the ceramic filler is a lithium-ion conducting glass ceramic powder selected from a group consisting of a doped lithium aluminum titanium phosphate (LATP) ceramic having the general composition $Li_2O$—$Al_2O_3$—$SiO_2$—$P_2O_5$—$TiO_2$—$GeO_2$ or lithium lanthanum titanate (LLTO) having the composition $Li_{0.35}La_{0.55}TiO_3$, and wherein the polymer precursors include poly(ethylene glycol) diglycidyl ether (PEGDGE) and O,O'-Bis(2-aminopropyl) polypropylene glycol-block-polyethylene glycol-block-polypropylene glycol;
   casting the mixture on a preheated substrate and curing to form a crosslinked composite electrolyte membrane; and
   subsequent to forming the composite electrolyte membrane from the mixture, plasticizing the composite electrolyte membrane by immersing the composite electrolyte in a plasticizer to obtain a gel composite membrane.

8. The method of claim 7, wherein ethanol is added to the mixture to aid in the dispersion of the ceramic powder.

9. The method of claim 7, including the step of ball milling the mixture prior to the step of casting.

10. The method of claim 7, wherein the substrate has a Teflon surface.

11. The method of claim 7, including the step of drying the composite electrolyte membrane prior to the step of plasticizing.

12. The method of claim 11, wherein the step of drying includes transferring the composite electrolyte membrane into an argon filled box and disposing the argon filled box in a vacuum furnace.

13. The method of claim 7, wherein the step of plasticizing is performed in a sealed container inside an argon filled box.

14. The method of claim 7, wherein the lithium salt is lithium bis-trifluoromethanesulfonimide (LiTFSI).

15. The method of claim 7, wherein the plasticizer is one selected from a group consisting of tetraethylene glycol dimethyl ether (TEGDME) and dimethyl carbonate (DMC).

* * * * *